UNITED STATES PATENT OFFICE.

JOHN JERMAIN PORTER, OF HAGERSTOWN, MARYLAND.

COLOR COMPOSITION AND PROCESS OF PREPARING SAME.

1,402,442.  Specification of Letters Patent.  Patented Jan. 3, 1922.

No Drawing.  Application filed November 29, 1919. Serial No. 341,527.

*To all whom it may concern:*

Be it known that I, JOHN J. PORTER, a citizen of the United States, residing at Hagerstown, county of Washington, State of Maryland, have invented certain new and useful Improvements in Color Compositions and Processes of Preparing Same; and I do hereby declare the following to be a full, clear, and exact description of the invention, such as will enable others skilled in the art to which it appertains to make and use the same.

This invention relates to color compositions and processes of preparing same; and it has to do more particularly with non-fluid compositions containing compounds of the type used or suitable for use in sympathetic inks.

As is well known, certain salts, particularly halogen and other salts of cobalt, nickel, and copper, which for the sake of a convenient generic designation may be termed metals whose atomic weights lie between 58 and 65, possess the property of changing color when warmed and resuming their original colors when cooled or moistened. Because of this property, salts of this type have been used heretofore in the form of solutions, as sympathetic inks and in various other ways in which advantage could be taken of the described characteristics.

For certain purposes it is desirable to have compositions which will act in a manner similar to sympathetic inks but which are in solid or non-fluid form instead of liquid. It is not feasible to use the pure salts in solid form or to use them mixed with a solid substance such as sugar or common salt or with any ordinary soluble agglutinant such as gum arabic, because all of these salts are highly deliquescent, so that the salts themselves, as well as mixtures thereof with solid substances like those just mentioned, take up moisture from the air to such an extent that they soon become syrupy. It is therefore an object of the present invention to provide changeable color compositions which contain compounds of the general type described, but which, instead of being in the form of solutions, are in solid or substantially solid form, and are capable of being used in a manner analogous to the use of ordinary water color paints, for example.

I have discovered that in order to provide a satisfactory changeable-color sympathetic ink or paint composition in solid form, it is necessary to mix the compounds in question, either singly or in any desired combination, with a solid diluent which is substantially insoluble in cold water and which has absorptive power, most desirably in high degree. The mixture may be so proportioned that when the deliquescent salt has absorbed enough water to be in equilibrium with the moisture in the air, the absorptive diluent will hold the water, and the mixture of the salt or salts and diluent will remain as a more or less solid and coherent mass which may become somewhat damp and even possibly pasty in consistency, but not fluid or syrupy. Such a composition may be molded into tablets or other form and is not subject to deterioration through the action of atmospheric moisture. It may be applied to paper or other material with a brush or otherwise, in a manner analogous to the application of water color paints and the like; and upon heating paper or other material to which it is applied, characteristic color developments or changes occur as in the case of ordinary sympathetic ink.

In a typical procedure illustrating one way of carrying out the invention in practice, a 20 per cent water solution of cobalt chlorid is mixed with sufficient flour to give a mass having the consistency of dough. This mass is then divided and molded or otherwise formed into tablets. Similarly, other color compositions can be produced in this manner by using other salts such as nickel chloride, copper bromide, copper chloride, cobalt sulfocyanate, nickel nitrate, copper sulfocyanate. Not only may the salts be used singly in conjunction with a suitable solid diluent to provide non-fluid compositions giving different colors upon heating, but variations may be produced by employing mixtures containing two or more of such salts.

Among other relatively insoluble absorptive solid diluents which may be used in place of or in conjunction with flour, may be mentioned insoluble finely divided or pulverulent materials such as kaolin, fuller's earth, starch, etc., or mixtures of any two or more of these. The solid diluents mentioned serve admirably where it is desirable that the color composition be substantially colorless in one of its phases. However, if desired, color pigments of various kinds may be used as solid diluents; and where these are employed, it is evidently possible to prepare compositions which undergo a wide variety of interesting color changes when heated. Compositions of the character described, which may be conveniently termed sympathetic ink paints, are of general utility but are more particularly useful in the form of tablets in toy paint box equipments, similar to the water-color boxes commonly used by children. As before stated the compositions may be applied in a manner entirely analogous to the application of ordinary water-colors with a brush or otherwise.

What I claim is:

1. The process of preparing a composition of the character described which comprises mixing a changeable-color compound with an absorptive solid diluent substantially insoluble in cold water, to form a non-fluid mixture.

2. The process of preparing a sympathetic ink or paint composition which comprises mixing a deliquescent changeable-color compound with a solid diluent substantially insoluble in cold water, to form a non-fluid mixture.

3. The process of preparing a sympathetic ink or paint composition which comprises mixing a deliquescent changeable-color compound with a sufficient proportion of absorptive and relatively insoluble material in finely divided condition to produce a coherent mass.

4. The process of preparing a changeable-color composition which comprises mixing a deliquescent changeable-color compound with a quantity of a dry absorptive diluent sufficient to hold the amount of moisture absorbed by the color compound.

5. The process of preparing a sympathetic ink or paint composition which comprises mixing a deliquescent changeable-color compound with a sufficient proportion of absorptive and relatively insoluble material in finely divided condition to produce a coherent mass, and forming shaped bodies of the mixture.

6. The process of preparing a changeable-color composition, which comprises forming a non-fluid mixture of the salt of a metal whose atomic weight is between 58 and 65 with a sufficient quantity of absorptive and relatively dry material in finely divided condition to give the mass a doughy consistency and then forming shaped bodies from the same.

7. A non-fluid changeable-color composition comprising a mixture of a changeable-color compound with absorptive and relatively insoluble solid material, said composition forming a coherent mass.

8. A non-fluid changeable-color composition comprising an absorptive and relatively insoluble finely divided material, with which is incorporated a changeable color compound consisting of a salt of a metal whose atomic weight is between 58 and 65.

9. A non-fluid changeable-color composition in the form of a shaped body, comprising a pulverulent absorptive and relatively insoluble material in mixture with a deliquescent color changing compound of a metal whose atomic weight is between 58 and 65.

10. A changeable-color composition comprising a deliquescent color compound combined with a sufficient quantity of a dry absorptive diluent to hold the hygroscopic moisture absorbed by the color compound.

In testimony whereof I hereunto affix my signature.

JOHN JERMAIN PORTER.